J. H. Crane,

Bed Bottom,

No. 1,491. Reissued June 9, 1863.

Witnesses:

W. B. Crosby

Francis Fowler

Inventor:

J. H. Crane

N. PETERS, PHOTO-LITHOGRAPHER, WASHINGTON, D. C.

UNITED STATES PATENT OFFICE.

JOHN H. CRANE, OF CHARLESTOWN, MASSACHUSETTS.

IMPROVED SPRING-BED.

Specification forming part of Letters Patent No. 27,700, dated April 3, 1860; Reissue No. 1,491, dated June 9, 1863.

*To all whom it may concern:*

Be it known that I, JOHN H. CRANE, of Charlestown, in Middlesex county, in the State of Massachusetts, have invented a new and useful Improvement in Spring-Beds; and I do hereby declare the following, taken in connection with drawings which accompany and form part of this specification, is a description thereof sufficiently full and exact to enable those skilled in the art to practice my invention.

The object of my invention is to produce a spring-slat bed with the smallest possible number of joints and parts, in such a manner that it shall be free, frictionless, and noiseless in its action, simple and cheap in its construction, durable under wear, and easy of dismemberment for transportation or for cleansing.

My invention consists of the employment, in combination with slats and supporting-rails, of the peculiarly-formed springs, arranged and operating substantially as shown and described.

Figure 1:
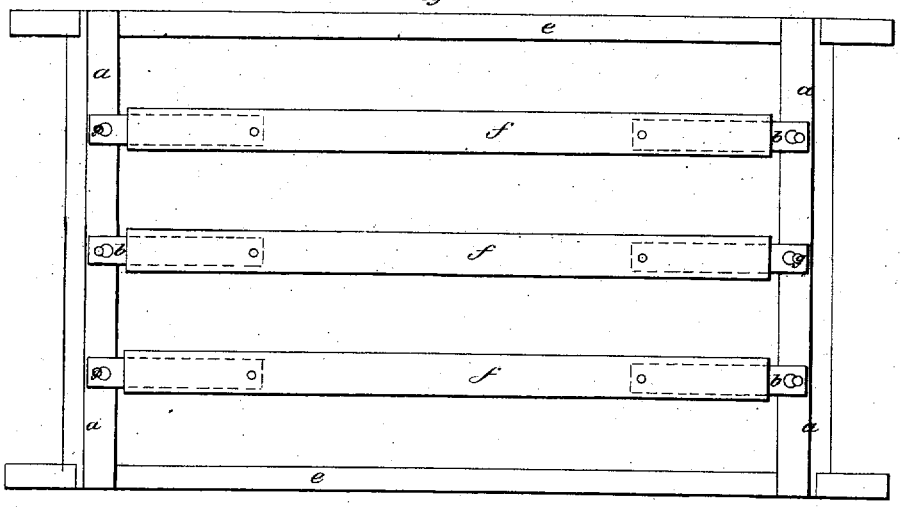
Figure 2:
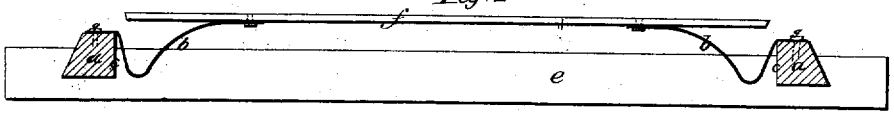
Figure 3:
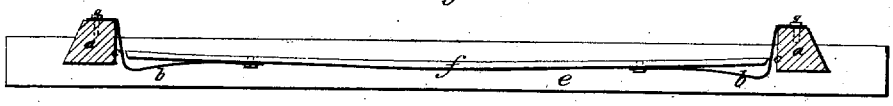

Figure 1 of the drawings is a plan of a bed-foundation embodying my invention. Fig. 2 is a sectional view of the same, showing the springs in their relation to the slats and rails when free from pressure; and Fig. 3 is a sectional view showing the relative position of the parts under pressure or load.

Inspection of the drawings will show that the rails *a*, to which the springs *b* are connected, (though said springs may be supported on any other suitable frame or bedstead,) are trapezoidal in section, with one side, *c*, at or nearly at right angles with the top and bottom of the rails, and that said sides *c* are the inner sides of the frame and adjacent to the ends of the slats. The outer sides, *h*, of the rails *a*, as will clearly appear in the drawings, form such an angle with the top and bottom of the rails as to lock or dovetail rails *a* to the rails *e*, in which grooves or mortises are formed corresponding to the section of *a*, so that without any other fastening the rails *a* will not be moved from any position in which they may be adjusted by any weight or load which may be placed upon the slats *f*.

The form of the springs are such that when secured in their places on the upper side of the rail they are offset or curved downward over its inner edge, but diverging therefrom, and then turn upward, terminating where connected with the slats at about the height of the upper faces of the rails. In the rail-supported ends of the springs are formed elongated openings, which at the end thereof nearest the slat are wider than the diameter of the screw-head, and at the other or outer end are of about the width of the diameter of the body of the screw, so as first to admit the passage of the screw-head through the springs and then prevent the disengagement of the springs from the screws.

The springs are so placed on the slats that when they are detached from the rails *a* the distance apart of the outer ends of the openings in the springs is about the distance apart of the outer sides of the screws, which renders it necessary to strain the slats and springs endwise to bring the large part of the opening in the spring at one end of the slat over the head of its screw, and this strain will draw the outer ends of the openings back against the bodies of the screws, and will secure the springs under the screw-heads, so that they cannot escape without moving the ends of the springs outward, which movement is also prevented by contact of the angle of the spring with the upper inner angle of the rail.

To disengage the slats from the screws, the spring at one end should be raised so that the angles aforesaid are no longer in contact. This allows the slat to be strained endwise, so that the enlarged part of the opening comes over the head of the screw, when the spring can be detached.

As the slats are depressed by load upon them, the part of the springs fastened to the slats by straightening lengthens, and but for the part of the spring near the sides *c* of the rails swinging backward or outward by the same pressure would require a link connection, involving joints, or else some provision for a sliding movement, (which would create friction and be noisy,) to allow of the endwise movement of the springs; but as my springs are bent down over the edge of the rail, I am enabled to hold the springs securely with but one screw, so as to prevent the slat from being moved sidewise and the springs from being moved outward so as to be in danger of disengagement from the screws, (which might otherwise happen if the springs were so fastened to the slats, or should set or get strained so as to leave the holes too far apart,) and at the same time permit disengagement by raising the slat, and the noiseless, frictionless movement of the springs, without involving the use of links, joints, or sliding of one part upon another; and the offset formation of the spring also secures great steadiness of the slats, because when under load and assuming the position seen in Fig. 3 the slats are suspended, rather than supported, by the springs.

I claim—

The employment of springs, formed, arranged, and operating as described, in combination with the slats and rails of a spring-bed.

J. H. CRANE.

Witnesses:
J. B. CROSBY,
FRANCIS GOULD.